United States Patent Office 3,439,031
Patented Apr. 15, 1969

3,439,031
N,N'-DICYANO-1,3-DIAZAPROPENES AND THE PREPARATION THEREOF FROM CYANAMIDES AND N-CYANOIMINOCARBONATES
Elwood P. Blanchard, Jr., Wilmington, Del., assignor to E. I. du Pont de Nemours and Company, Wilmington, Del., a corporation of Delaware
No Drawing. Filed June 15, 1965, Ser. No. 464,210
Int. Cl. C07c 149/24, 149/42, 121/60
U.S. Cl. 260—551  13 Claims

ABSTRACT OF THE DISCLOSURE

Described and claimed are N,N'-dicyano-1,3-diazapropenes of the formula

wherein Y is O or S; R is hydrocarbyl or substituted hydrocarbyl and $M^\oplus$ is H, $NH_4$, hydrocarbylammonium or another cation. The compounds of this invention are prepared by the reaction of cyanamide or an alkali metal cyanamide with N-cyanoiminocarbonates at temperatures of 0–150° C. and are useful as antistatic additives for hydrocarbon fuels and fiber-forming polycarbonamides.

---

This invention is concerned with, and has as its principal objects provision of, a new class of ionic organic compounds, a process for their preparation, and the use of the same as antistatic agents.

There have now been produced the N,N'-(or 1,3-)dicyano-1,3-diazapropenes and a process for their preparation by the reaction of certain cyanamides with an N-cyanoiminocarbonate or an N-cyanodithiaiminocarbonate. The products of the invention may be represented by Formula I:

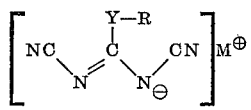

(I)

where Y is O or S; R is hydrocarbyl of 18 carbon atoms or les swherein any unsaturation is aromatic (alkyl, cycloalkyl, aryl, alkaryl, aralkyl) or —$(CH_2)_2YH$,

—$(CH_2)_3YH$ or

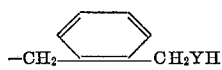

Y being as above; and M is one equivalent of a cation, particularly hydrogen, any metal ion, or an ammonium or hydrocarbyl-substituted ammonium ion in which the hydrocarbyl substituents may be alike or different and are defined as is the hydrocarbyl part of R, above.

The process by which the products of this invention may be prepared may be represented by the reaction of an N-cyanoiminocarbonate or an N-cyanodithiaimiocarbonate of Formula II with cyanamide or an alkali metal cyanamide of Formula III to yield the respective free acids or alkali metal salts of Formula IV. Compounds of Formula IV may undergo metathesis with any other salt, such as an ammonium, alkaline earth metal, or transition metal salt of formula M″X to yield the corresponding salt of Formula V:

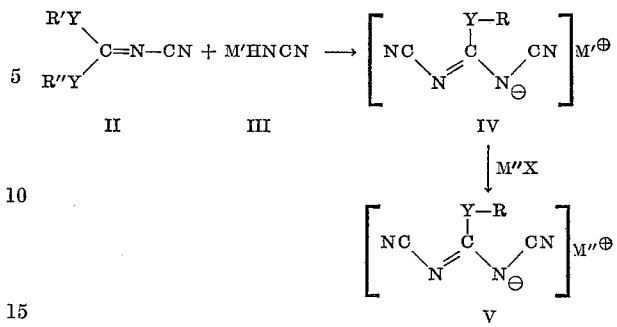

in which M' is hydrogen or an alkali metal ion (Li, Na, K, Rb, Cs, Fr); M″ is one equivalent of an ammonium, hydrocarbyl-substituted ammonium (as defined above), alkaline earth, or transition metal ion; R and Y are as above; R' and R″, which may be the same, are the same as R or may be joined together in a hydrocarbyl diradical Q of 18 carbons or less (and particularly 8 carbon atoms or less) in which any unsaturation is aromatic and in which the two bonds of the diradical stem from carbon atoms which are adjacent or separated by one or two carbon atoms (e.g., in an unsubstituted or hydrocarbyl-substituted 2-cyanoimino-1,3-dioxolane, -1,3-dithiepane, etc.); and X is one equivalent of the anion of a strong inorganic acid, i.e., chloride, bromide, sulfate, nitrate, or phosphate.

It will be noted that in the initial reaction above, one of the bonds between the two Y's and the depicted carbon breaks. When R' and R″ or the two Y's are different, i.e., when the starting material is asymmetrical, a mixture of the possible isomers may thus be obtained.

In the definition of M (Formula I, above), a metal ion is understood to include every known metal, i.e., elements of atomic numbers 3, 4, 11–13, 19–32, 37–51, 55–84, and 87–103 inclusive. It is intended that the total scope of M shall equal the exact sum of the scopes of M' and M″.

The acids of the invention (M=H) are obtained when cyanamide itself is used as a starting material, by ion exchange with an ion-exchange resin (see Example 10), or by other methods known to the art.

The N,N'-dicyano-1,3-diazapropenes of Formula I are ionic crystalline solids useful as antistatic additives for hydrocarbon fuels. When incorporated into hydrocarbon fuels at very low concentrations, these compounds increase the conductivity of the fuel and thereby dissipate static electricity of the type generated during pumping and blending operations. This is illustrated in Example A below.

The N,N'-dicyano-1,3-diazapropenes of Formula I are also useful for reducing static propensity when incorporated in amounts ranging from 1 to 15% by weight into fiber-forming polycarbonamides characterized by having recurring interunit amide linkages as an integral part of the polymer chain. This use is illustrated in Example B below. Suitable polycarbonamides include polyamides, polyurethanes, polyureas, and polysulfonamides. The preparation of such polymers is shown in U.S. Patents 2,071,250, 2,071,253, 2,130,948, 2,284,637, 2,708,617, 2,731,446 and 2,831,834 and British Patent 535,139. Particularly suitable polycarbonamides are polyhexamethyleneadipamide, polycaproamide, and the polyamides from bis(4-aminocyclohexyl)methane and azelaic, sebacic, and dodecanedioic acids.

In carrying out the reaction of an N-cyanoiminocarbonate or N-cyanodithiaiminocarbonate with cyanamide or an alkali metal cyanamide, no added reaction medium is required. The reactants may be brought into intimate contact by known means, such as by impact grinding, and the corresponding N,N'-dicyano-1,3-diazapropene or alkali metal salt thereof will be formed. For best yields of the desired product, it is preferred to carry out the reaction in the presence of a polar liquid, such as a lower alkanol, or an aqueous alcohol solution. Other liquids which are inert to the reactants and products may also be present, such as tetrahydrofuran, acetonitrile, and the like. An aqueous alcohol solution is preferred.

The reaction by which the products of this invention may be prepared may be carried out at temperatures ranging from 0° to 150° C. Pressure is not a critical factor in the process, and pressures above and below atmospheric pressure may be employed by operating in a closed reactor. Atmospheric pressure is preferred.

The molar ratios of reactants of Formulas II and III, which may be brought together to carry out the reaction noted above, may be varied widely in the range from 20:1 to 1:20. Molar ratios around 1:1 are preferred.

The reaction of an N,N-dicyano-1,3-diazapropene or an alkali metal salt thereof, i.e., a compound of Formula IV, with a compound M″X, defined as above, is preferably carried out in the presence of water and hence at temperatures in the range from 0–100° C. Pressure is not a critical factor, and pressures above and below atmospheric pressure may be employed by operating in a closed reactor. Atmospheric pressure is preferred. The molar ratio in which a compound of Formula IV and a compound M″X may be brought together to carry out the above reaction may be varied widely in the range from 20:1 to 1:20. Molar ratios in the range of about 1:1 to 1:2 are preferred.

In the following examples parts are by weight and Example 6 represents a preferred embodiment.

EXAMPLE 1

Sodium N,N'-dicayano-2-methylthio-1,3-diazapropenide

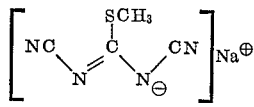

To a solution of 1.05 parts of N-cyano-bis(methylthio)methylenimine (Hantzsch and Wolvekamp, Ann. 331, 285–7 (1904)) in 22 parts of tetrahydrofuran is added 0.46 part of sodium cyanamide followed by 16 parts of ethyl alcohol. The mixture is heated at reflux and 3 parts of water are added to effect solution. Solvents are then evaporated to leave sodium N,N'-dicyano-2-methylthio-1,3-diazapropenide as a mass of colorless crystals.

EXAMPLE 2

Sodium N,N'-dicayano-2-methylthio-1,3-diazapropenide

To a solution of 10.5 parts of N-cyano-bis(methylthio)methylenimine in 90 parts of tetrahydrofuran and 80 parts of ethyl alcohol is added 4.6 parts of sodium cyanamide. The mixture is heated at reflux for 0.5 hour and then 9 parts of water are added. The solvents are evaporated to leave 10.55 parts of crude sodium N,N'-dicyano-2-methylthio-1,3-diazapropenide. Recrystallization from 100 parts of ethyl alcohol gives 6.5 parts of sodium N,N'-dicyano-2-methylthio-1,3-diazapropenide as white needles.

Analysis.—Calcd. for $C_4H_3N_4NaS$: C, 29.6; H, 1.9; N, 34.6; S, 19.75. Found: C, 30.4; H, 2.2; N, 36.0; S, 19.3.

EXAMPLE 3

Sodium N,N'-dicyano-2-(β-mercaptoethylthio)-1,3-diazapropenide

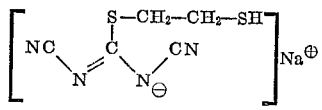

Part A.—To a solution of 18.8 parts of 1,2-dibromoethane in 159 parts of absolute methanol is added 19.4 parts of dipotassium N-cyanodimercaptomethylenimine. After stirring 16 hours at room temperature, the mixture is heated at reflux for one hour, cooled, filtered, and the filtrate concentrated by evaporation. The residue is poured into 300 parts of ice water and the precipitate collected on a filter and recrystallized from aqueous alcohol to give 8.5 parts of [2-N-cyanoimino]-1,3-dithiolane, M.P. 78–79° C.

Analysis.—Calcd. for $C_4H_4N_2S_2$: C, 33.20; H, 2.77; N, 19.44; S, 44.40. Found: C, 33.47; H, 2.78; N, 19.00; S, 44.84.

Part B.—To a solution of 1.46 parts of 2-N-cyanoimino-1,3-dithiolane in 18 parts of tetrahydrofuran is added 0.64 part of sodium cyanamide and 16 parts of ethyl alcohol and the mixture is heated at reflux for 0.5 hour. Enough water is added to effect solution of the precipitated solid and the solvents are distilled to leave crude sodium N,N'-dicyano-2-(β-mercaptoethylthio)-1,3-diazapropenide as a colorless solid.

EXAMPLE 4

Octadecyltrimethylammonium N,N'-dicyano-2-methylthio-1,3-diazapropenide

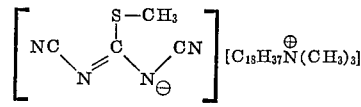

A mixture of 1.62 parts of sodium N,N'-dicyano-2-methylthio-1,3-diazapropenide and 3.92 parts of octadecyltrimethylammonium bromide in 100 parts of distilled water is heated to boiling. The mixture is then cooled and the resultant crystals collected by filtration. The crystals are dissolved in ethyl acetate, the solution is dried over magnesium sulfate and filtered and the ethyl acetate is evaporated. The residue is recrystallized from dimethoxymethane to give 3.5 parts of octadecyltrimethylammonium N,N'-dicyano-2-methylthio-1,3-diazapropenide, M.P. 69.5–71° C.

EXAMPLE 5

Dioctadecyldimethylammonium N,N'-dicyano-2-methylthio-1,3-diazapropenide

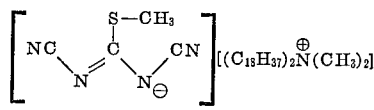

To a boiling slurry of 8 parts of dioctadecyldimethylammonium chloride in 200 parts of water is added a solution of 2.2 parts of sodium N,N'-dicyano-2-methylthio-1,3-diazapropenide in 25 parts of water. The mixture is cooled and the product collected by filtration. The residue is dissolved in cyclohexane, the solution dried over anhydrous magnesium sulfate and filtered, and the cyclohexane evaporated to give 5.6 parts of dioctadecyldimethylammonium N,N'-dicyano-2-methylthio-1,3-diazapropenide.

EXAMPLE 6

Sodium N,N'-dicyano-2-methylthio-1,3-diazapropenide

To a solution of 4 parts of sodium hydroxide in 80 parts of ethyl alcohol is added 8.4 parts of 50% by weight aqueous cyanamide and a solution of 14.6 parts of N-cyano-bis(methylthio)methylenimine in 90 parts of tetrahydrofuran. The mixture is heated at reflux for 0.5 hour and then the solvents are evaporated. The residue is recrystallized from ethyl alcohol containing just enough water to effect solution while at reflux to give 12.0 parts of sodium N,N'-dicyano-2-methylthio - 1,3 - diazapropenide as white needles.

EXAMPLE 7

Sodium N,N'-dicyano-2-neopentyloxy-1,3-diazapropenide

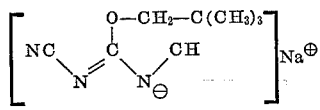

Part A.—A solution of 40 parts of neopentyl alcohol in 357 parts of ether is stirred and flushed with nitrogen for 30 minutes. The solution is kept at 0–5° C. while about 175 parts of 15% n-butyllithium in hexane is slowly added. The resulting solution of lithium neopentoxide is added over a three-hour period to a solution of 35 parts of cyanogen chloride in 179 parts of ether. The reaction mixture is kept between −10° and 0° C. during the addition. The reaction mixture is then allowed to warm to room temperature and to stand overnight. Ether and hexane are carefully removed on a rotary evaporator at room temperature. The residue is washed with 264 parts of benzene and filtered. The benzene extract is distilled to give 26.9 parts of N-cyano-bis(neopentyloxy)methylenimine, boiling point 107–108° C. at 0.05 mm. Hg.

*Analysis.*—Calcd. for $C_{12}H_{22}N_2O_2$: C, 63.68; H, 9.80; N, 12.38. Found: C, 63.89; H, 9.74; N, 12.21.

Part B.—To a solution of 2.86 parts of N-cyano-bis-(neopentyloxy)methylenimine in 6.4 parts of ethyl alcohol is added 0.84 part of 50% by weight aqueous cyanamide and a solution of 0.4 part of sodium hydroxide in 2.2 parts of ethyl alcohol. The mixture is heated at reflux for 0.25 hour and then most of the alcohol distilled. The residue is treated with 143 parts of ethyl ether and filtered to leave 1.88 parts of sodium N,N'-dicyano-2-neopentyloxy-1,3-diazapropenide as a colorless salt.

EXAMPLE 8

Octadecyltrimethylammonium N,N'-dicyano-2-neopentyloxy-1,3-diazapropenide

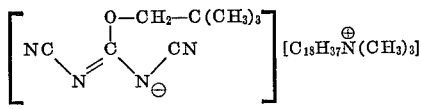

To a stirred, hot solution of 2.5 parts of octadecyltrimethylammonium bromide in 30 parts of water is added a solution of 1.88 parts of sodium N,N'-dicyano-2-neopentyloxy-1,3-diazapropenide in 10 parts of water. The mixture is warmed and an oil phase separates. After 10 minutes the mixture is extracted with ethyl acetate (2×45 parts). The ethyl acetate extract is dried over magnesium sulfate, filtered and the ethyl acetate evaporated. The oily residue solidifies on standing to give 3 parts of octadecyltrimethylammonium N,N'-dicyano - 2 - neopentyloxy-1,3-diazapropenide as a white wax.

*Analysis.*—Calcd. for $C_{29}H_{57}ON_5$: C, 69.7; H, 12.1; N, 14.8. Found: C, 69.6; H, 11.5; N, 15.4.

EXAMPLE 9

Tetramethylammonium 2-benzylthio-N,N'-dicyano-1,3-diazapropenide

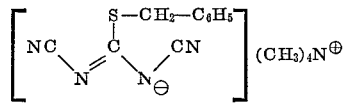

To a warm solution of 14.9 parts of N-cyano-bis(benzylthio)methylenimine (Fromm and van Goncz, Ann. 355, 196–197 (1907)) in 79 parts of absolute alcohol is added a solution prepared from 2 parts of sodium hydroxide, 12 parts of absolute alcohol and 5 parts of a 50% by weight solution of cyanamide in water. The mixture is heated at reflux for 15 minutes and then concentrated by evaporation of solvents and benzyl mercaptan at reduced pressure. The remaining sodium 2-benzylthio-1,3-dicyano-1,3-diazapropenide is taken up in 100 parts of water and filtered. The aqueous phase is treated with an excess of tetramethylammonium chloride. The crystalline precipitate is collected by filtration to obtain 12.25 parts of tetramethylammonium 2-benzylthio-N,N'-dicyano-1,3-diazapropenide as white crystals melting at 109.5–111.0° C.

*Analysis.*—Calcd. for $C_{14}H_{19}N_5S$: C, 58.15; H, 6.57; N, 24.21; S, 11.07. Found: C, 58.28; H, 6.66; N, 23.54; S, 11.07.

EXAMPLE 10

N,N'-dicyano-2-methylthio-1,3-diazapropene

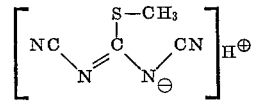

A solution of 8.1 parts of sodium N,N'-dicyano-2-methylthio-1,3-diazapropenide in 25 parts of water is passed through an acid ion exchange column prepared from 30 parts of acidic ion-exchange resin ("Rexyn"® RG–50–(H)). The column is eluted with 100 parts of water and the eluent is concentrated at reduced pressure at 25° C. to give 6.6 parts of N,N'-dicyano-2-methylthio-1,3-diazapropene as a colorless crystalline solid. When 1.4 parts of N,N'-dicyano-2-methylthio-1,3-diazapropene is dissolved in 10 parts of water and made alkaline with 6 N sodium hydroxide and then the water evaporated, there is obtained 1.34 parts of sodium N,N'-dicyano-2-methylthio-1,3-diazapropenide.

In the procedure of Example 9, when the cyanoiminocarbonates and cyanoiminodithiacarbonates indicated under A in the following table are substituted for N-cyano-bis(benzylthio)methylenimine, the cyanamides indicated under B are substituted for sodium cyanamide and the salts indicated under C are substituted for tetramethylammonium chloride, the cation of the intermediate product obtained in place of sodium 2-benzylthio-1,3-dicyano-1,3-diazapropenide is indicated under D, and the final product obtained in place of tetramethylammonium 2-benzylthio-1,3-dicyano-1,3-diazapropenide is indicated under E.

TABLE

| Item | A<br>Cyanoiminocarbonate | B<br>Cyanamide | C<br>Salt | D<br>Cation of of intermediate salt | E<br>Final product |
|---|---|---|---|---|---|
| 1 | 2-N-cyanoimino-o-xylylene-methylene disulfide. | Potassium cyanamide | Tetraethylammonium chloride. | K+ | Tetraethylammonium 1,3-dicyano 2-(2-[mercaptomethyl]benzylthio)-1,3-diazapropenide. |
| 2 | 2-N-cyanoimino-1,3-dithiane | Cesium cyanamide | Tetra-n-butylammonium iodide. | Cs+ | Tetra-n-butylammonium 1,3-dicyano-2-(3-mercaptopropylthio)-1,3-diazapropenide. |
| 3 | N-cyano-bis(cyclopentylthio) methylenimine. | Sodium cyanamide | Calcium chloride | Na+ | Calcium 1,3-dicyano-2-(cyclopentylthio)-1,3-diazapropenide. |
| 4 | N-cyano-bis(phenoxy)methylenimine. | ....do.................. | Octadecyltrimethyl ammonium iodide. | Na+ | Octadecyltrimethylammonium 1,3-dicyano-2-phenoxy-1,3-diazapropenide. |
| 5 | N-cyano-bis(p-tolyloxy)-methylenimine. | Cyanamide | Nickelous sulfate | ¹ H+ | Nickelous 1,3-dicyano-2-(p-tolyloxy)-1,3-diazapropenide. |
| 6 | N-cyano-bis(phenylthio)-methylenimine. | Sodium cyanamide | Cobaltous nitrate | Na+ | Cobaltous 1,3-dicyano-2-(phenylthio)-1,3-diazapropenide. |
| 7 | N-cyano-bis(β-naphthylthio)-methylenimine. | Potassium cyanamide | Dioctadecyldimethylammonium chloride. | K+ | Dioctadecyldimethylammonium 1,3-dicyano-2-(β-naphthylthio)-1,3-diazapropenide. |
| 8 | N-cyano-bis(octadecylthio)-methylenimine. | Sodium cyanamide | Tetramethylammonium iodide. | Na+ | Tetramethylammonium 1,3-dicyano-2-(octadecylthio)-1,3-diazapropenide. |

¹ Free acid.

As noted above, the compounds of this invention are useful as antistatic additives for hydrocarbon fuels and for fiber-forming polycarbonamides. These utilities are shown by the following.

EXAMPLE A

Octadecyltrimethylammonium 1,3-dicyano - 2 - methylthio-1,3-diazopropenide (Example 4) is dissolved in a hydrocarbon jet engine fuel (JP–5 type) at a concentration of ten pounds per thousand barrels of fuel. The treated fuel shows a sharply decreased static propensity. The conductivity of the treated fuel, determined according to the condenser method of A. Klingenberg and J. L. van der Minne, "Electrostatics in the Petroleum Industry," Elsevier Publishing Company, 1958, pages 169–172, is 528 picomho/meter. The untreated fuel has a conductivity of 0.8 picomho/meter in the same test. (One picomho/meter $=10^{-14}$ohm$^{-1}$cm.$^{-1}$.)

EXAMPLE B

Three parts by weight of octadecyltrimethylammonium N,N'-dicyano-2-neopentyloxy - 1,3 - diazapropenide (Example 8) were blended with 97 parts of 66 nylon at 283° C. The blend was cooled, cut into flakes, dried, and extruded through a spinneret at 285° C. The white multifilament yarn obtained by this process had a resistivity expressed as log R of 12.4 which insures a static-free nonclinging garment or carpet. Log R of pure 66 nylon fiber equals 15 to 15.5.

Since obvious modifications and equivalents in the invention will be evident to those skilled in the chemical arts. I propose to be bound solely by the appended claims.

The embodiments of the invention in which an exclusive property or privilege is claimed are defined as follows:

1. A compound of the formula

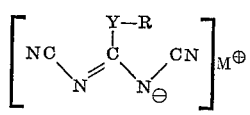

wherein Y is selected from the group consisting of oxygen and sulfur;
R is selected from the group consisting of alkyl of up to 18 carbons, cyclopentyl, benzyl, phenyl, p-tolyl, naphthyl, —(CH₂)₂YH, —(CH₂)₃YH, and

Y being as above; and
M is selected from the group consisting of hydrogen one equivalent of a metal, ammonium and hydrocarbyl-substituted ammonium in which the hydrocarbyl substituents are alkyl of 1–18 carbons.

2. A compound of claim 1 wherein the negative radical is N,N'-dicyano-2-methylthio-1,3-diazapropenide.

3. An alkali metal N,N'-dicyano-2-methylthio-1,3-diazapropenide.

4. Octadecyltrimethylammonium N,N'-dicyano-2-methylthio-1,3-diazapropenide.

5. Dioctadecyldimethylammonium N,N' - dicyano-2-methylthio-1,3-diazapropenide.

6. N,N'-dicyano-2-methylthio-1,3-diazapropene.

7. A compound of claim 1 wherein the negative radical is N,N'-dicyano-2-(β-mercaptoethylthio) - 1,3 - diazapropenide.

8. An alkali metal N,N'-dicyano-2-(β-mercaptoethylthio)-1,3-diazapropenide.

9. A compound of claim 1 wherein the negative radical is N,N'-dicyano-2-neopentyloxy-1,3-diazapropenide.

10. An alkali metal N,N'-dicyano-2-neopentyloxy-1,3-diazapropenide.

11. Octadecyltrimethylammonium N,N'-dicyano-2-neopentyloxy-1,3-diazapropenide.

12. A compound of claim 1 wherein the negative radical is 2-benzylthio-N,N'-dicyano-1,3-diazapropenide.

13. Tetramethylammonium 2-benzylthio-N,N'-dicyano-1,3-diazapropenide.

References Cited

Huffman et al.: J. Org. Chem., vol. 28, pp. 1816–1821, July 1963.

HENRY R. JILES, *Primary Examiner.*

H. I. MOATZ, *Assistant Examiner.*

U.S. Cl. X.R.

44—72; 252—500, 518, 521; 260—2.1, 77.5, 78, 79, 429, 429.7, 431, 435, 438, 439

UNITED STATES PATENT OFFICE
CERTIFICATE OF CORRECTION

Patent No. 3,439,031　　　　　　Dated April 15, 1969

Inventor(s) Elwood P. Blanchard, Jr.

It is certified that error appears in the above-identified patent and that said Letters Patent are hereby corrected as shown below:

Column 1, line 49, "les swherein" should read -- less wherein --;

Column 5, in the formula between lines 14 and 20, $$\underset{\ominus}{N}\diagup^{CH} \quad \text{should be} \quad \underset{\ominus}{N}\diagup^{CN}$$

Column 8, following references cited, the following United States Patents cited by the Examiner in the Office action of October 20, 1967 have been omitted:

3,225,077; 12/1965　　Schaefer et al.　　260-453
3,291,827; 12/1966　　Huffman et al.　　260-551.

SIGNED AND
SEALED

NOV 4 1969

(SEAL)
Attest:

Edward M. Fletcher, Jr.　　　　　　WILLIAM E. SCHUYLER, JR.
Attesting Officer　　　　　　　　　Commissioner of Patents